United States Patent [19]

Imamura

[11] Patent Number: 5,168,594
[45] Date of Patent: Dec. 8, 1992

[54] RETRACTABLE WIPER DEVICE
[75] Inventor: Takayuki Imamura, Shizuoka, Japan
[73] Assignee: Asmo Co., Ltd., Kosai, Japan
[21] Appl. No.: 545,700
[22] Filed: Jun. 29, 1990
[30] Foreign Application Priority Data Jun. 30, 1989 [JP] Japan .................. 1-168905

[51] Int. Cl.$^5$ .............. B60S 1/22; B60S 1/24
[52] U.S. Cl. .................... 15/250.16; 74/70; 74/75; 74/600
[58] Field of Search ........... 15/250.16, 250.17, 250.3, 15/250.34, 250.13; 74/600, 601, 70, 75

[56] References Cited

U.S. PATENT DOCUMENTS

| | | | |
|---|---|---|---|
| 2,753,721 | 7/1956 | Latta | 74/600 |
| 3,242,767 | 3/1966 | Simpson | 74/600 |
| 3,665,772 | 5/1972 | Beard et al. | 74/75 |
| 3,699,605 | 10/1972 | Bellware | 74/600 |
| 4,400,844 | 8/1983 | Hayakawa et al. | 15/250.16 |
| 4,494,421 | 1/1985 | Matuoka | 74/600 |
| 4,559,845 | 12/1985 | Fallows | 15/250.16 |
| 4,686,733 | 8/1987 | Sahara | 15/250.16 |
| 4,729,144 | 3/1988 | Sahara et al. | 15/250.16 |
| 4,794,818 | 1/1989 | Eustache et al. | 15/250.16 |
| 4,916,774 | 4/1990 | Arlon et al. | 15/250.16 |
| 4,924,726 | 5/1990 | Rogakos et al. | 15/250.16 |

FOREIGN PATENT DOCUMENTS

| | | |
|---|---|---|
| 200119A2 | 12/1986 | European Pat. Off. . |
| 2583491 | 6/1985 | France . |
| 57-118957 | 7/1982 | Japan . |
| 59-190648 | 12/1984 | Japan . |
| 61-244639 | 10/1986 | Japan . |
| 62-299452 | 12/1987 | Japan . |
| 63-45988 | 9/1988 | Japan . |
| 2191681A | 12/1987 | United Kingdom . |

Primary Examiner—Harvey C. Hornsby
Assistant Examiner—Gary K. Graham
Attorney, Agent, or Firm—Burns, Doane, Swecker & Mathis

[57] ABSTRACT

Herein disclosed is a retractable wiper device which comprises: a first crank connected for forward and backward rotations to the reduction output shaft of a motor; and a second crank rotatably supported on the first crank such that it is kept in association at a predetermined bent angle with the first crank, while the first crank is being rotated forward, and in general association with the first crank while the first crank is being rotated backward. When in the forward rotation of the first crank, a stopper is always pushed to keep its engagement with the first crank thereby maintaining the aforementioned predetermined bent angle by two overlapped cams which are associated with each other at a predetermined play angle. When in the backward rotation of the first crank, on the other hand, the push of the stopper by the two cams is released in the vicinity of the top turn position of a wiper blade, and the portion of the stopper in the vicinity of the pushed portion by the cams is relieved in the forward direction of the first crank. As a result, the first and second cranks are generally linear in the vicinity of the top turn position of the wiper blade.

17 Claims, 14 Drawing Sheets

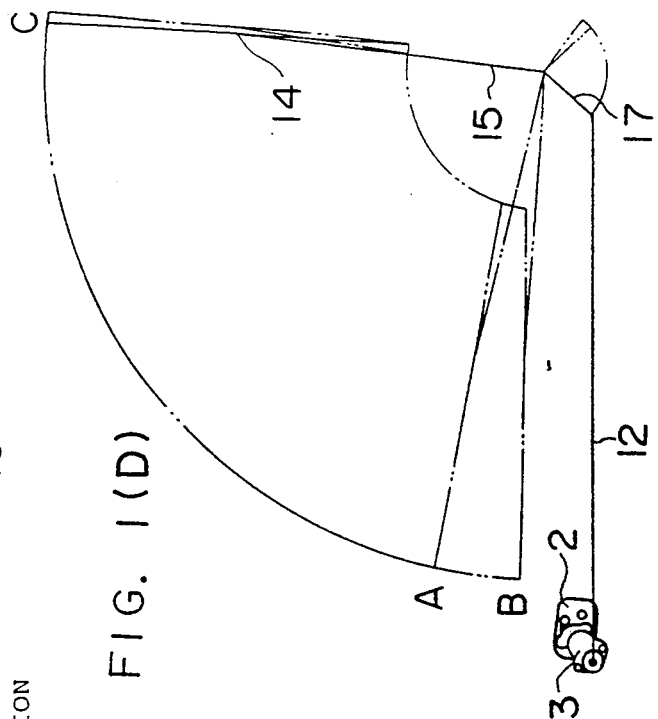
FIG. 1(A) REVERSE START (WIPER TOP TURN POSITION)
FIG. 1(C) UPPER CAM OPENS, AND PITCH STARTS TO CHANGE
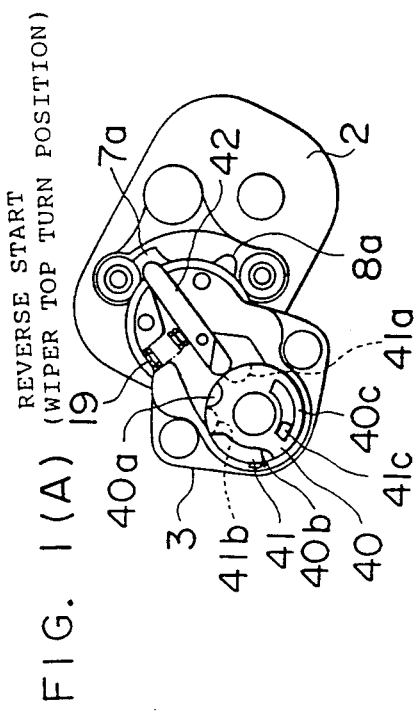
FIG. 1(B)
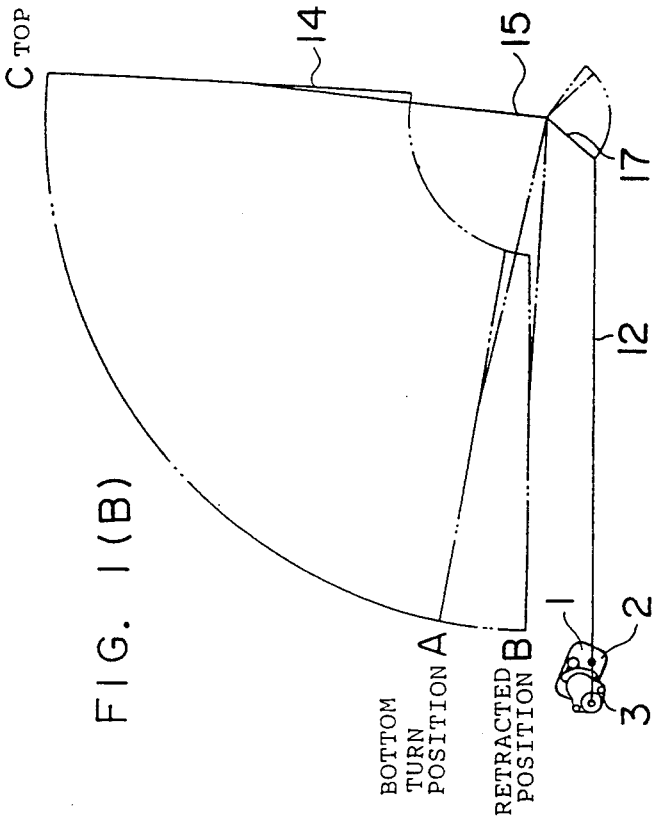
FIG. 1(D)

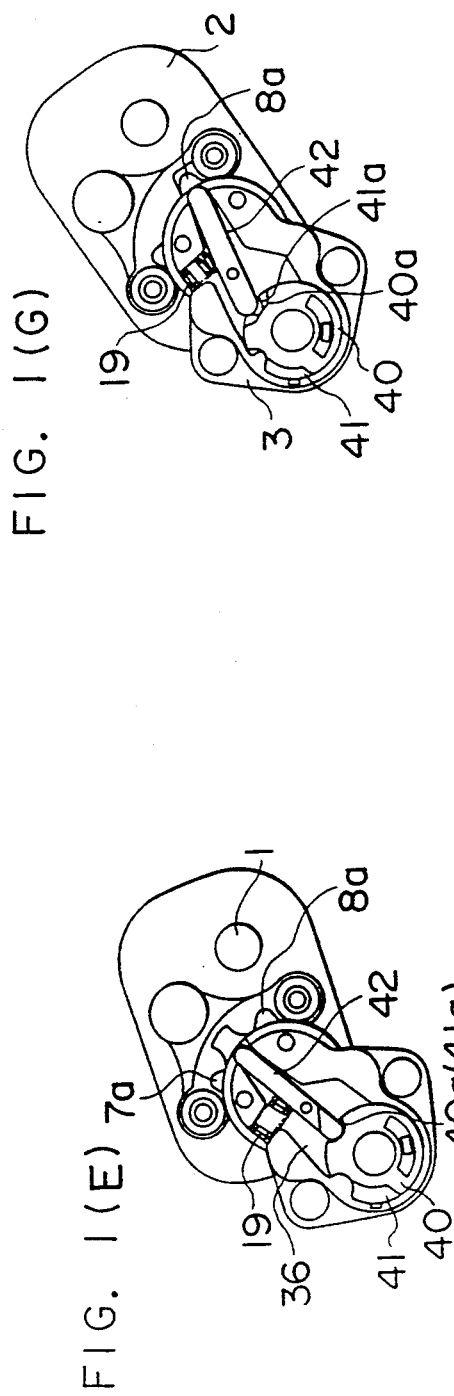
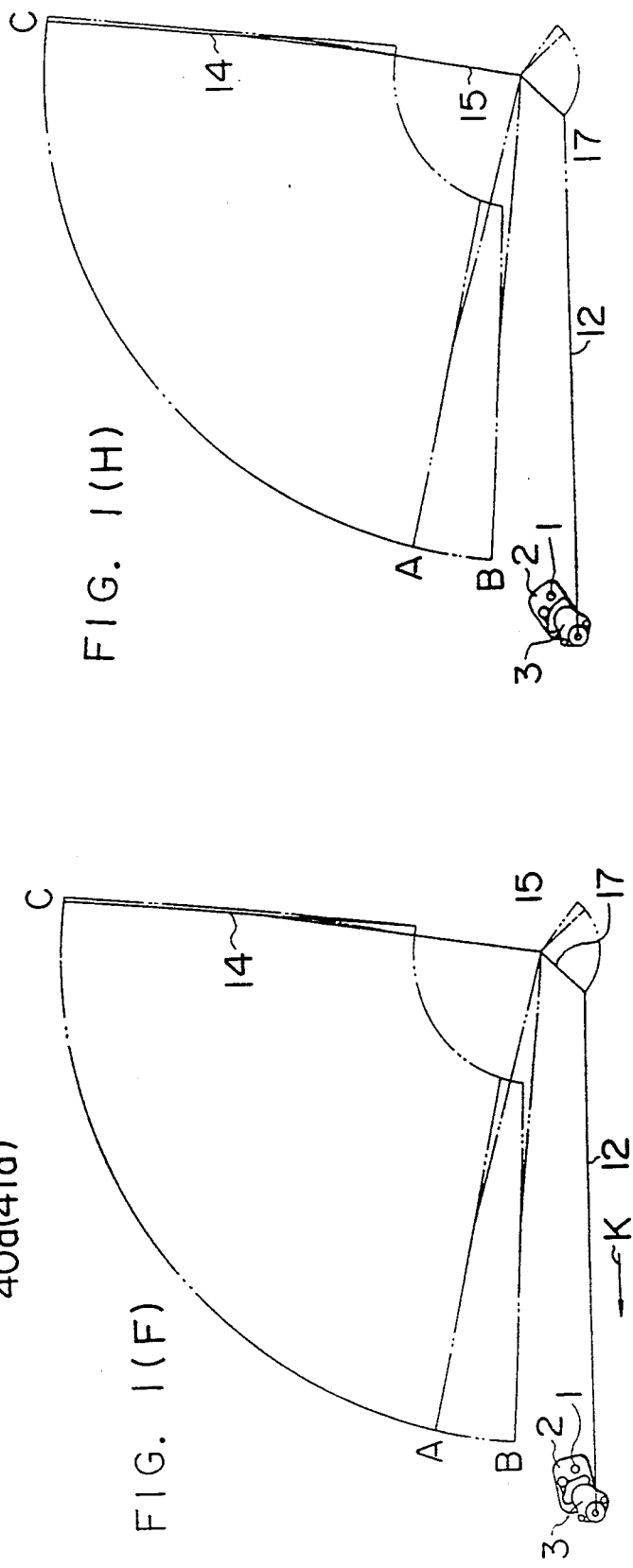

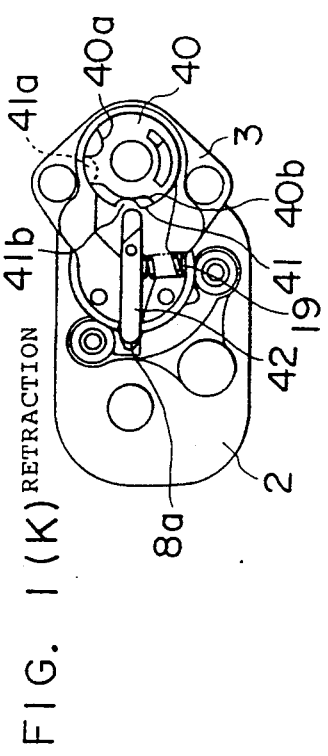
FIG. 1(K) RETRACTION
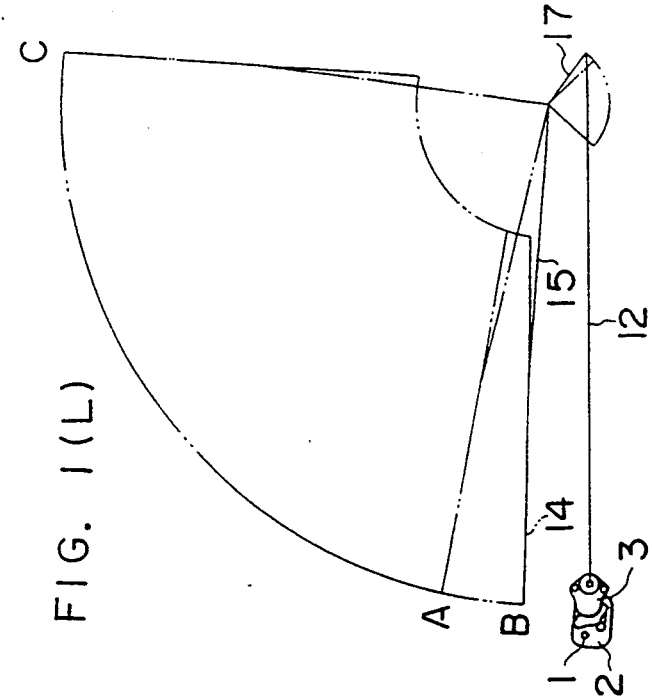
FIG. 1(L)
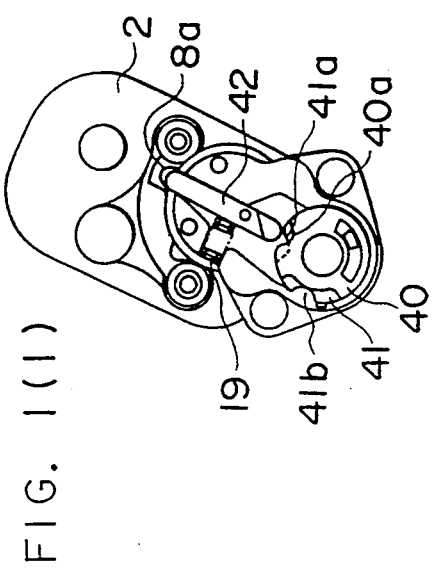
FIG. 1(I)
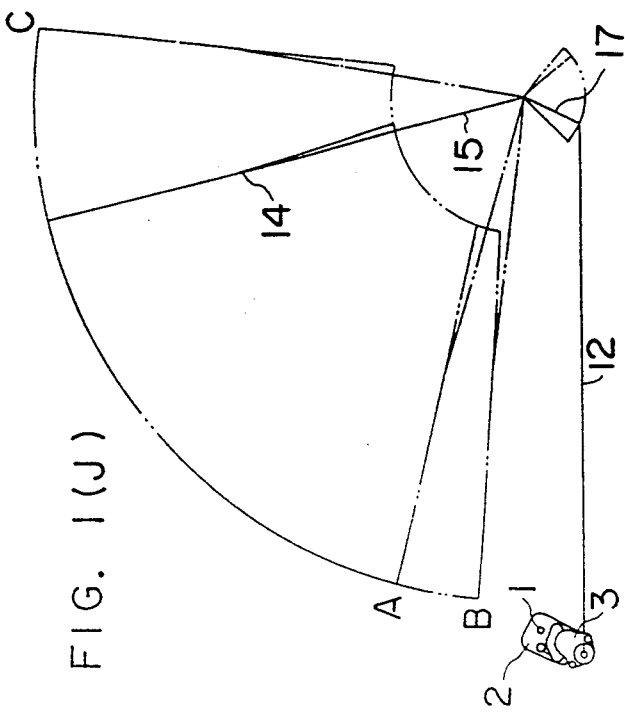
FIG. 1(J)

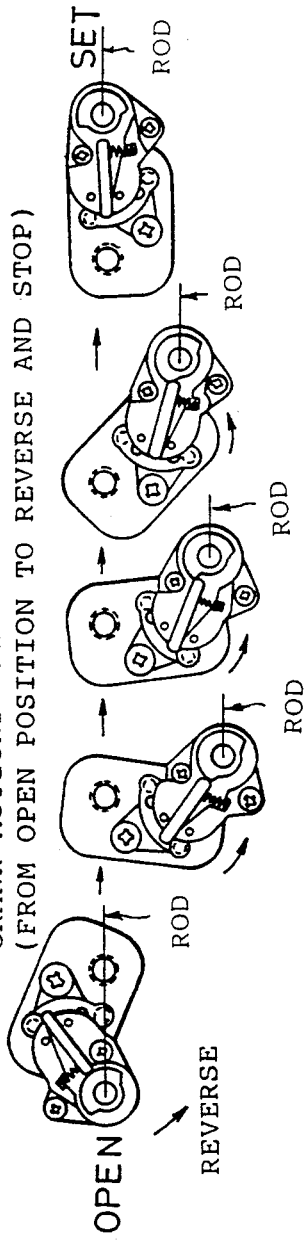
FIG. 10(A) CRANK MOTIONS WHEN WIND SCREEN WET (FROM OPEN POSITION TO REVERSE AND STOP)
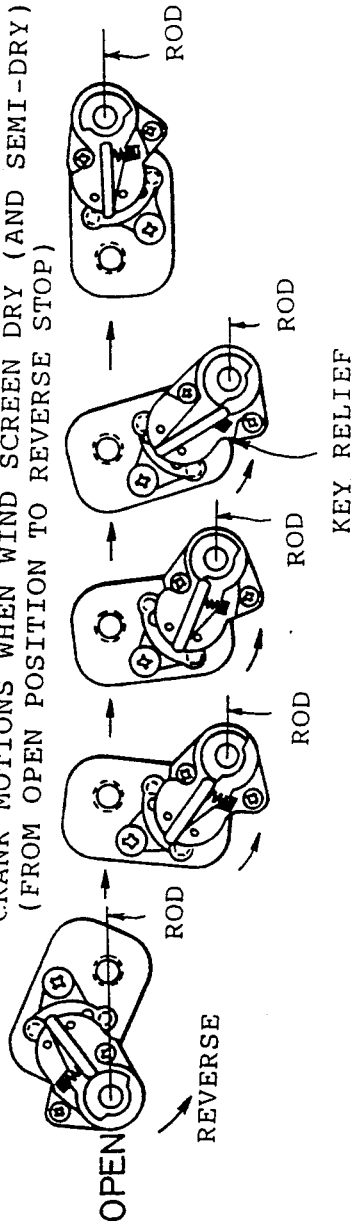
FIG. 10(B) CRANK MOTIONS WHEN WIND SCREEN DRY (AND SEMI-DRY) (FROM OPEN POSITION TO REVERSE STOP)

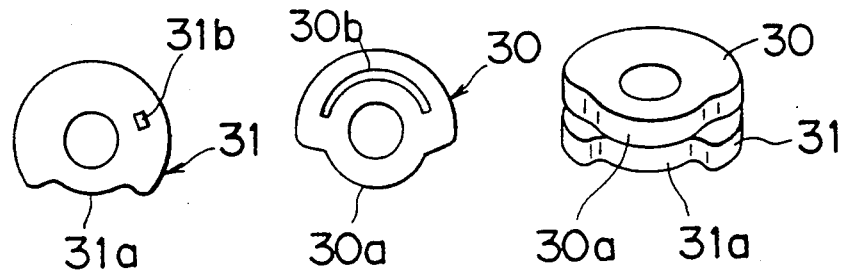
FIG. 17(A) PRIOR ART
FIG. 17(B) PRIOR ART
FIG. 17(C) PRIOR ART
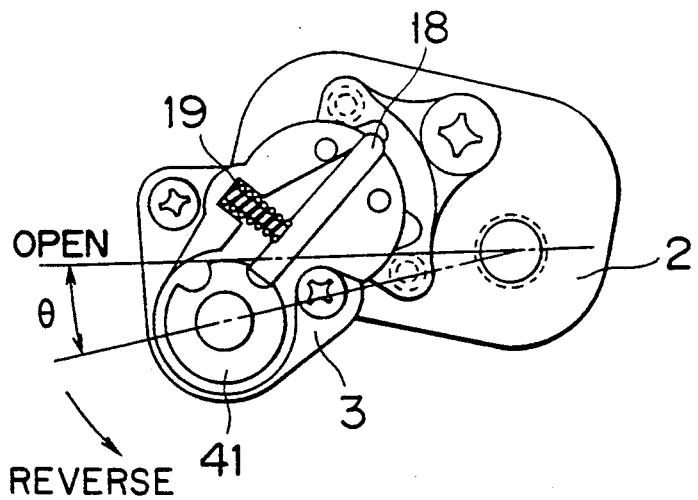
FIG. 18 PRIOR ART

5,168,594

RETRACTABLE WIPER DEVICE

BACKGROUND OF THE INVENTION

1. Field of the Invention

The present invention relates to a wiper device for wiping off the front glass shield of an automobile and, more particularly, to an improvement in a retractable wiper device for retracting its blade below a bottom turn position.

2. Description of the Prior Art

In a retractable wiper device of this kind, there has been proposed in the prior art a wiper device (as disclosed in Japanese Utility Model Application Laid-Open No. 59-190648), as shown in FIGS. 12 to 14.

Specifically, in these Figures: reference numeral 1 designates the output shaft of a reduction gear mechanism connected to a motor; numeral 2 a first crank; numeral 3 a second crank; numeral 4 a nut for fastening the output shaft 1 and the first crank 2; numeral 5 a projecting spindle projecting from the second crank 3; numeral 6 a nut for supporting the second crank 3 on the first crank 3 in a rocking manner; numerals 7 and 8 block edges formed on the first crank 2; numerals 7a and 8a recesses to engage with the second crank 3; numeral 9 a spindle fixed in the second crank 3; numeral 10 a cam fitted on the spindle 9; numeral 11 a bearing member integrated with the cam 10; numeral 12 a link; numeral 13 a bearing member at the side of the link 12; numeral 14 a wiper blade; numeral 15 an arm for supporting the wiper blade 14; numeral 16 a rocking shaft for the arm 15; numeral 17 a rocking lever associated with the link 12 and fixed to the rocking shaft 16; numeral 18 a slidable stopper mounted on the second crank 3; numeral 19 a spring for urging the stopper 18 in a direction so as to project from the second crank 3; numeral 20 a guide frame accommodating the spring 19 for guiding the same when the stopper 18 moves; and numeral 21 a mounting screw for fastening the guide frame 20 to the second crank 3.

In a ordinary wiping operation, the output shaft 1 of the motor is rotationally driven in a forward direction, as indicated by an arrow P in FIG. 14. If the first crank 2 is rotated in this direction, the second crank 3 associated through the link 12 and the rocking level 17 with the wiper arm 15 is rotated on the pivot 5 in the direction opposite to the direction P relative to the first crank 2 by the rotational reaction until it is bent to abut against the block edge 8 of the first crank 2. Simultaneously with this, the stopper 18 is introduced into the recess 7a by the urging force of the spring 19 and engaged at the bent angle. The second crank 3 is rotated on the output shaft 1 in the direction of the arrow P while being bent with respect to the first crank 2, and the rocking shaft 16 is reciprocated by the link 12 and the rocking lever 17 so that the wiping operation is carried out by the wiper blade 14.

The range for the wiper blade 14 to be reciprocated with the second crank 3 which is bent with respect to the first crank 2 is between a bottom turn position A and a top turn position C. Next, when a wiper switch (not shown) is turned off, the motor is reversed by an automatic fixed-position stop mechanism (not shown) so that the wiper arm is moved from the aforementioned position, which is taken when the wiper switch (not shown) is turned off, and is stopped at the bottom turn position A of the aforementioned operation range.

Through this reversing operation, the first crank 2 is rotated in the direction opposite to that of the arrow P. through the rotational reaction, the second crank 3 associated with the wiper blade 14 through the link 12 is rotated on the pivot 5 in the direction of the arrow P relative to the first crank 3 until it is rotated to abut against the block edge 7 of the first crank 2 and is extended. Simultaneously with this, the stopper 18 is introduced into the recess 8a by the urging force of the spring 19 to engage with the same at the extended angle.

Thus, the crank effective length when the second crank 3 is extended linearly with respect to the first crank 2, i.e., the inter-axis length joining the output shaft 1 and the spindle 9 is larger than the inter-axis length joining the output shaft 1 and the spindle 9 when the second crank 3 is bent. As a result, as shown in FIG. 14, the wiper blade 14 in the ordinary stop position (i.e., the bottom turn position) is retracted across the operation range into its retracted position B.

In the aforementioned wiping operation and blade retracting operation, the cam 10 fitted on the spindle 9 of the second crank 3 is rotated on the spindle 9 integrally with the link 12. In the forward rotations of the wiping operation, the cam 10 pushes and suppresses the stopper 18 engaging the recess 7a and leaves the stopper 18 when it rotates backward at a small angle (about 35 degrees) after the ordinary rotation (of 180 degrees). When the second crank 3 is completely extended with respect to the first crank 2, the cam 10 pushes and suppresses the stopper 18 engaging with the recess 8a.

The retractable wiper device thus constructed is enabled by a simple mechanism to retract the wiper blade from the ordinary stop position A into the retracted position B. In the forward rotation (for the wiping operation) of the motor, however, the cam 10 assumes a state in which it does not push the stopper 18, once its in its first rotation when the wiper device operates with the first crank 2 and the second crank 3 being bent at a desired angle. In this state, the binding force for inserting the stopper 18 into the recess 7a of the block edge 7 depends absolutely upon the pushing force of the spring 19 so that it is in an unstable state causing clattering or squeaking. Slight shocks are thereby caused at the leading end of the wiper blade 14 giving an unstable feel to the driver.

Therefore, I have proposed an improvement in which the aforementioned cam 10 is made to have a structure of two overlapping sheets so as to maintain the bent state of the first and second cranks 2 and 3, i.e., the state, in which the stopper 18 is fitted in the engagement recess 7a, while the first crank 2 is rotationally driven in the forward direction (as disclosed in Japanese Patent Application Laid-Open No. 61-244639).

Cam members 30 and 31 are arranged in place of the aforementioned cam 10 and are individually formed with two recesses 30a and 30b, and 31a and 31b at positions spaced at an angle $\theta$ of 120 degrees, as shown from (A) to (C) in FIG. 15. Moreover, the cam member 30 to be fixed on the aforementioned bearing member 11 is formed with a concentric, arcuate groove 30c which extends from the surface and to the back and has a play angle of 60 degrees, for example. The other cam member 31 is equipped with a pin 31c to be fitted in that arcuate groove 30c. As a result, during the forward rotations of the first crank 2, the arcuate face of the upper cam member 30 excepting the aforementioned recesses 30a and 30b faces the stopper 18 even if the recess 31a of the lower cam member 31 comes to a position to face the stopper 18. Thus, this stopper 18 is pushed and fixed in the engagement recess 7a so that the first and second cranks are kept in their bent states.

I have also proposed another improvement in the retractable wiper device of this kind (as disclosed in Japanese Patent Laid-Open No. 62-299452).

This proposal is intended to eliminate the drawback in the procedure for which the wiper blade 14 is operated from the retracted position B to ordinary rotation by the forward drive of the motor. Specifically, in the course of the relation between the first crank 2 and the second crank 3 to change from the linearly extended position to the bent position, the aforementioned stopper 18 comes out of the recess 8a toward the cam side. If, at this time, an external force such as an intense wind is exerted upon the wiper while the vehicle is running at a high speed, the wiper is forced upward in its rotation direction so that the cam member 30 relating to the link 12 and the rocking lever 17 is rotationally accelerated in the forward direction in addition to its ordinary rotations. Considering this acceleration, the above-specified proposal forms a relief space 36 so that the stopper 18 may be inclined around the side of the first crank 2 in the forward direction of the second crank 3, as shown in FIG. 16. Moreover, the spring 19 is arranged to keep the aforementioned stopper 18 in a predetermined position at all times. In case, with this structure, the aforementioned cam member 30 is rotationally accelerated in the forward direction, said stopper 18 is inclined into the relief space 36 against the elastic force of the spring 19. Then, the arcuate face at the outside of the cam comes into smooth contact with the trailing end face of the stopper 18 to prevent the cam member 30 and the stopper 18 from collision or hooking onto each other. As a result, the aforementioned second crank 3 continues its bending motion in this state until the stopper 18 comes to a position facing the recess 7a. According to the proposal thus far described, it is possible to effectively avoid both breakage whcih might otherwise be caused by the collision or hooking of the members and the state in which the first crank 2 and the second crank 3 might otherwise be brought to a predetermined bent angle.

The cam members 30 and 31 disclosed in the aforementioned proposal are formed with the recesses 30a and 31a having different angular apertures, as shown in FIG. 17. One cam member 30 is formed with the concentric, arcuate groove 30b having a play angle of about 180 degrees, and the other cam member 31 is formed with the bulge 31b to be fitted in the arcuate groove 30b.

In any of the proposals thus far described, while the motor is rotating backward, the extending and contracting behaviours of the crank arm are changed in accordance with the state of the wind screen (or the front glass) because the crank arm is extended and contracted by the load of the wiper (i.e., the load for the blade to wip off the glass). This phenomena will be described with reference to FIGS. 10 and 11.

FIG. 10 shows the operations where the blade is retracted from the top turn position C into the retracted position B by the backward drive of the motor. The wind screen is wet in the state shown at (A) in FIG. 10 and is dry or semi-dry in the state shown at (B) in FIG. 10.

With the wind screen being dry or semi-dry, as shown by broken lines in FIG. 11, the crank arm has its pitch changed from its bent state to its extended state, when in its retracting operation. As a result, the wiper blade has its speed dropped around the central portion of its wiping pattern so that the speed is increased to complete the retraction after the crank arm is extended. Thus, the operation feel is so bad as to raise an eyesore to the driver. Because of the aforementioned movements of the wiper blade, streaks of water droplets are left due to the change in the wiping speed of the blade, thus raising a problem of obstructing the field of vision of the driver.

With the wind screen being wet, on the other hand, the motions of the blade being retracted are smoother than those in the wet state. However, because of the low load, the shifts of the first and second cranks 2 and 3 to the extended positions may not be smooth. The position, at which the crank arm is extended, is highly dispersed to make the aforementioned more serious than when in the dry or semi-dry state.

SUMMARY OF THE INVENTION

It is, therefore, an object of the present invention to provide a retractable wiper device which improves the operation feeling drastically irrespective of the state of the wind screen by making the wind blade retracting movements constant and smooth.

According to the present invention, there is provided a retractable wiper device which comprises:

a first crank connected to a reduction output shaft of a motor for being rotated forward and backward;

a second crank having a cover and rotatably supported to the first crank for being rotated into a first state so as to be bent at a predetermined angle with respect to the first crank while the first crank is being rotated forward and for being rotated into a second state so as to be substantially linear with respect to the first crank while the first crank is being rotated backward;

a stopper member supported movably by the second crank so that it is pushed into engagement with the first crank when the second crank is brought into the first or second state, to keep the second crank in the first or second state;

a cam which includes: a first cam member rotatably supported to the second crank and secured to a link for transmitting a rotation of the second crank to a wiper blade that is connected operatively to the link, the first cam member having a first face for pushing the stopper member into engagement with the first crank and a second face for releasing the engagement of the stopper member with the first crank; and a second cam member provided at the second crank so as to be coaxial with the first cam member and in contact with the first cam member at a predetermined angle of play between the first and second cam members, the second cam member having a third face for pushing the stopper member into engagement with the first crank and a fourth face for releasing the engagement of the stopper member with the first crank, the cam being shaped such that the first face and the third face keep the stopper member in engagement with the first crank in a pushed state at all times when the first crank is being rotated in the forward direction in order to reach a forward rotated state and such that the second face and the fourth face overlap one another when the wiper blade nears a top position, at which point a rotation of the first crank is reversed such that the first crank proceeds toward a backward rotated state at which the engagement of the stopper and the first crank is released; and a first relief portion provided between the second crank and the cover for relieving the end portion of the stopper member at the side of the cam in the direction of forward rotation of the first crank when the first crank is in the backward rotated state.

In the present invention, the cam shapes of the retractable wiper device are such that both the first and second cam members are oriented such that the stopper member is released when the wiper blade is in the vicinity of the top turn position while the first crank is rotating backward, and the stopper member slides through the relief portion and is released from its engagement with the first crank when the first crank and the second crank are transformed into a substantially linear state.

The present invention has its first structural feature structure in the cam shape of first and second cam members and its second structural feature in the stopper relief portion.

Here, the stopper relief portion according to the second structural feature is identical to that of the preceding proposal (as disclosed in Japanese Patent Application Laid-Open 62-299452). Thanks to the interactions of the two structural features, however, the following operations can be realized by adding the first structural feature to the second structural feature.

Specifically, when in the backward rotations of the first crank, both the first and second cam members are set in the suppression release position of the stopper in the vicinity of the top turn position of the wiper blade. As a result, the first and second cranks can be released from their bent states in the vicinity of the top turn position of the wiper blade and shifted to the extended states.

If, in this state, the first crank is uninterruptedly rotated backwards, the stopper is moved to the relief portion thanks to the second structural feature of the present invention because the stopper is released from the suppression state. As a result, no breakage is caused due to the collision or hooking onto of the members so that the abrupt crank pitch change in the vicinity of the top turn position, i.e., the shift to the extended states of the first and second cranks can be smoothly executed. Moreover, the crank pitch in that position can be promptly changed by the inertia or static frictional force at the turn of the arm or blade even if the wind screen is wet. In the dry or semi-dry state, the abrupt pitch change can likewise be secure by the frictional resistance. Thus, in the vicinity of the top turn position, the shift to the extended states of the first and second cranks can be completed without fail irrespective of the state of the wind screen.

At the time of the abrupt crank pitch change, the backward rotating force of the first crank is hardly transmitted to the second crank. As a result, the wiper arm has its movement stopped once in the vicinity of its top turn position. Since, however, the movement stop position is in the vicinity of the turn position, the movements establish no abnormal feel and are not stopped unlike the prior art in the vicinity of the center of the wiping pattern of the wiper blade so that an excellent operation feel can be attained. Moreover, the problem of leaving the wipe partially due to the stop of the blade in the vicinity of the turn position can be solved. Since no speed changes in the switching operation from the bent states to the extended states, it is possible to prevent the water splashes and the sliding sounds, which might otherwise accompany the blade retraction.

BRIEF DESCRIPTION OF THE DRAWINGS

Other objects, features and advantages of the present invention will be described in the following with reference to the accompanying drawings, in which:

FIG. 1 presents at (A) to (L) schematic diagrams for explaining the individual operations of an embodiment when a wiper blade is to be retracted;

FIG. 10 presents at (A) and (B) schematic diagrams for explaining the motions of the crank of the prior art when the wind screen is wet and dry, respectively;

FIG. 17 presents at (A) to (C) schematic diagrams for explaining the structure of two cam members adopted in the structure shown in FIG. 16; and FIG. 18 is a schematic diagram for explaining the drawbacks in case the stopper is not bent.

DESCRIPTION OF THE PREFERRED EMBODIMENTS

The present invention will be described in the following in connection with one embodiment thereof with reference to the accompanying drawings.

Figure 2:
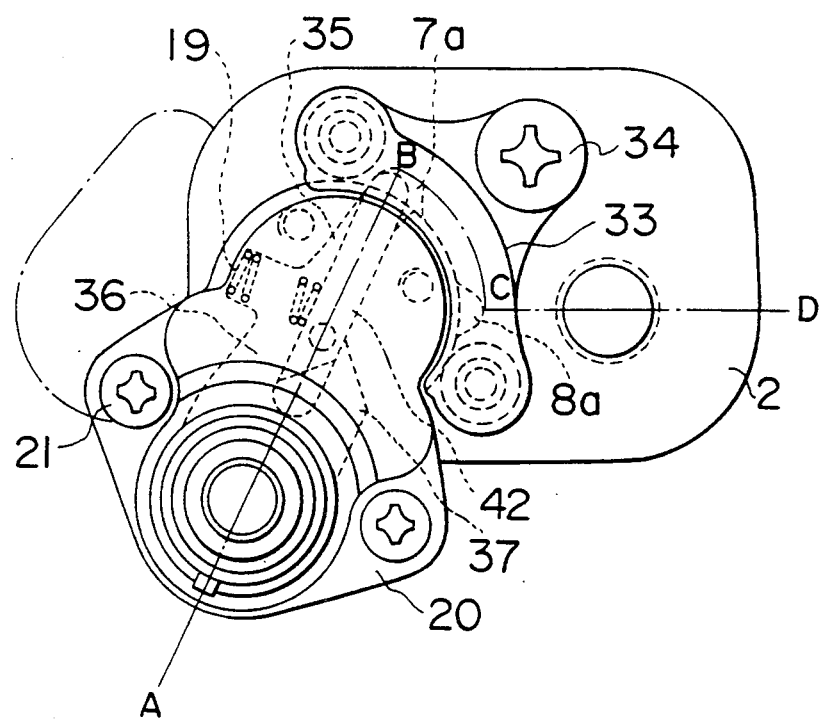
FIG. 2 is a top plan view for explaining the connected state of first and second cranks.
Figure 3:
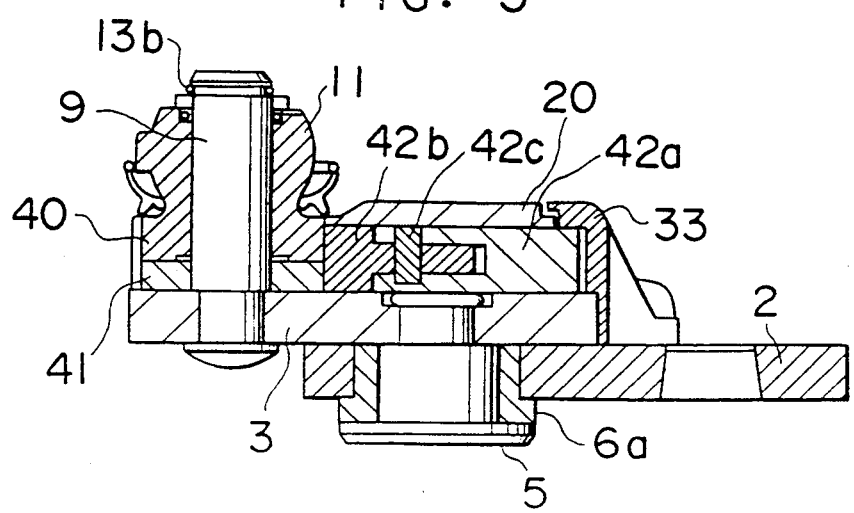
FIG. 3 is a section taken along line A-B-C-D of FIG. 2.
Figure 4:
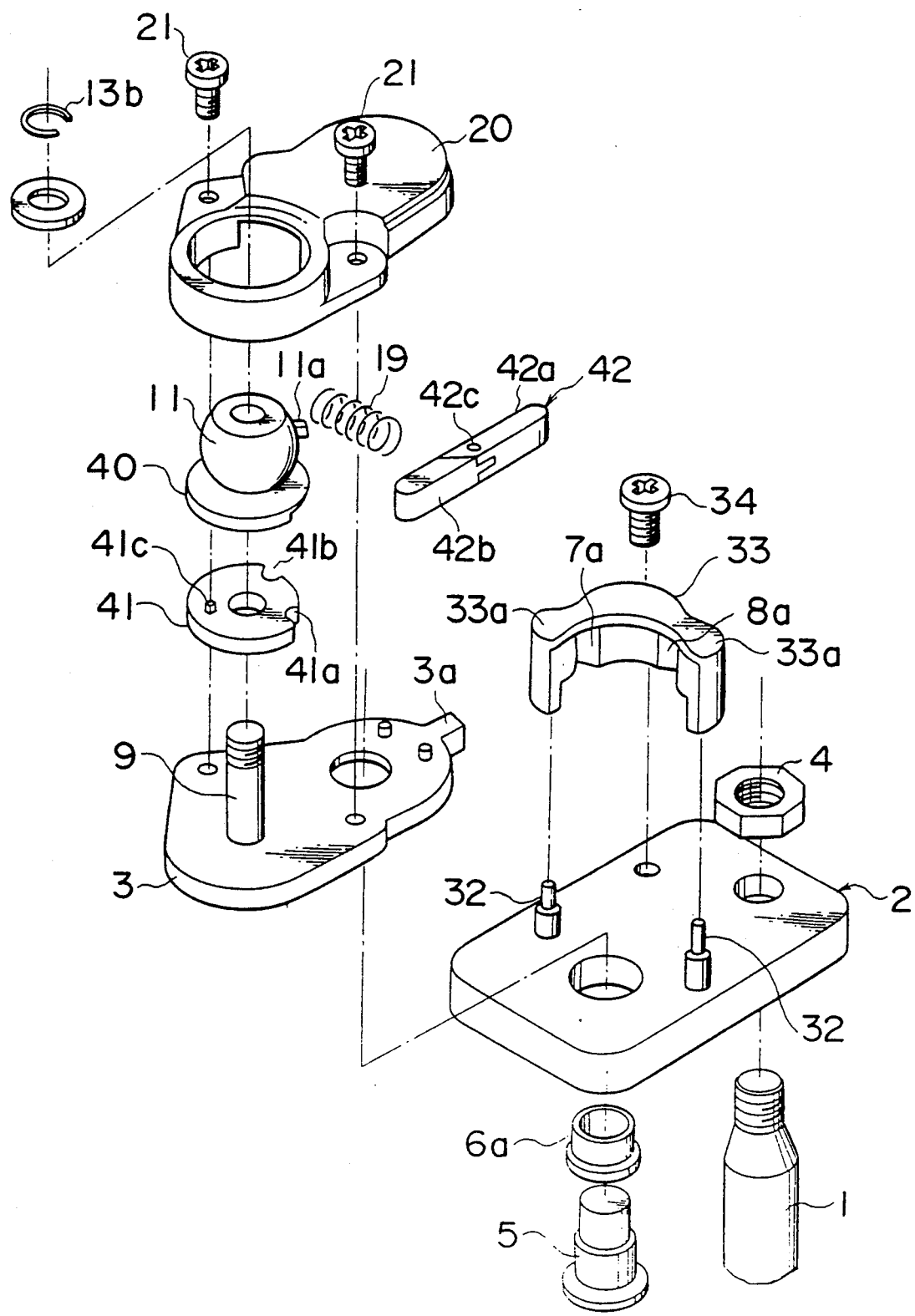
FIG. 4 is an exploded perspective view showing the first and second cranks.

In FIGS. 2 to 4, the same or similar parts of those of the aforementioned retractable wiper device according to the prior art are designated at common reference characters. Specifically, a first crank 2 is fixedly connected to a motor reduction output shaft 1 by means of a nut 4. A second crank 3 is rotatably connected to the first crank 2 through a sleeve 6a by means of a projecting pivot 5 which in turn is integrally fixed to the second crank 3. An arcuate block member 33 is fixed to the first crank 2 and is formed with engagement recesses 7a and 8a. A spindle 9 is fixed in the second crank 3. A cam is composed of first and second two-stacked cam members 40 and 41, as will be described hereinafter, and is rotatably fitted on the spindle 9. The upper first cam member 40 is formed integrally with a bearing member 11 which is fitted on the spindle 9. This bearing member 11 is connected to a link side bearing member 13 by a connecting pin 11a projecting from the surface thereof and is prevented from coming out by a snap ring 13b while being allowed to rotate on the spindle 9 integrally with a link 12. A wiper blade 14 is connected to one end of a wiper arm 15. The other end is fixed together with one end of a rocking lever 17 to a rocking shaft 16. The other end of the rocking lever 17 is fixedly connected to the link 12. The aforementioned arcuate block member 33 is fitted at its two ends 33a on two pins 32 anchored to the first crank 2 and is fixed at its generally central portion by a screw 34. The second crank 3 has its extension and bent angle regulated in such an angular position that a leading projection 3a of the second crank 3 abuts against the two ends 33a of the block member 33. This block member 33 is formed with the aforementioned recesses 7a and 8a for receiving a stopper 42 in the extended and bent angle positions.

To the second crank 3, there is attached by a screw 21 a guide frame 20 which is formed with a bulge facing the arcuate recess of the block member 33. The guide frame 20 is formed with a guide groove 35 for guiding the stopper 42 internally. This guide groove 35 is formed with a first relief space 36 which is expanded as a relief around the block member 33 in the forward direction of the second crank 3. The stopper 42 is always urged by a spring 19 in the reverse direction of the second crank 3 from the relief space 36.

Figure 5A:
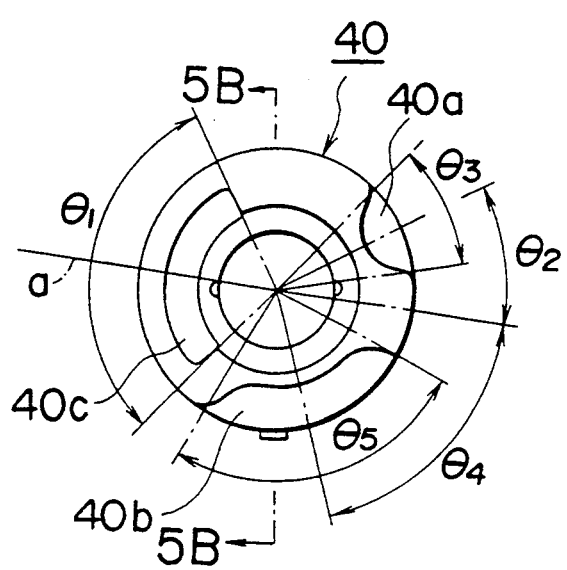
FIG. 5 presents at (A) and (B) a top plan view and a section showing a first cam member.

Next, the structures of the aforementioned first and second cam members 40 and 41 will be described with reference to FIGS. 5 and 6.

Figure 5B:
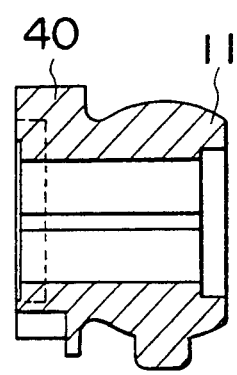

The first cam member 40 is formed integrally with the aforementioned bearing member 11, as shown in FIG. 5(B), and is positioned below the bearing member 11. This first cam member 40 is formed in its lower face with a concentric, arcuate groove 40c over an angular aperture of $\theta_1$. The cam member 40 is further formed in its lower face with a recess 40a having an angular aperture of $\theta_3$ at an angular position of $\theta_2$ with respect to the center line a bisecting the angular aperture of that arcuate groove 40c. The first cam member 40 is further formed in its lower face with a recess 40b which is cut at an angular position of $\theta_4$ over an angular aperture of $\theta_5$ at the opposite side of the recess 40a with respect to the center line a.

Figure 6A:
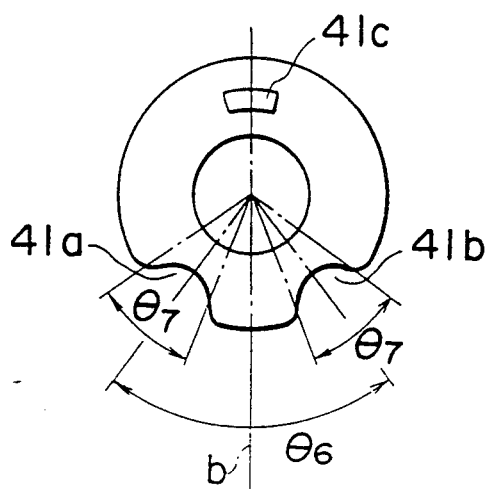
FIG. 6 presents at (A) and (B) a top plan view and a righthand side elevation showing a second cam member.
Figure 6B:
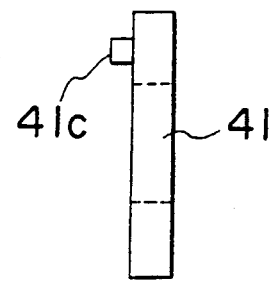

The aforementioned second cam member 41 is formed with a projection 41c projecting from the side facing the first cam member 40, as shown in FIG. 6. The projection 41c thus formed is loosely fitted in the concentric, arcuate groove 40c of the first cam member 40. The second cam member 41 is further formed with recesses 41a and 41b having an angular aperture of $\theta_7$ which are positioned at an angle of $\theta_6/2$ at the righthand and lefthand sides of the projection 41c with respect to the center line.

Figures 7A, 7B, 7C:
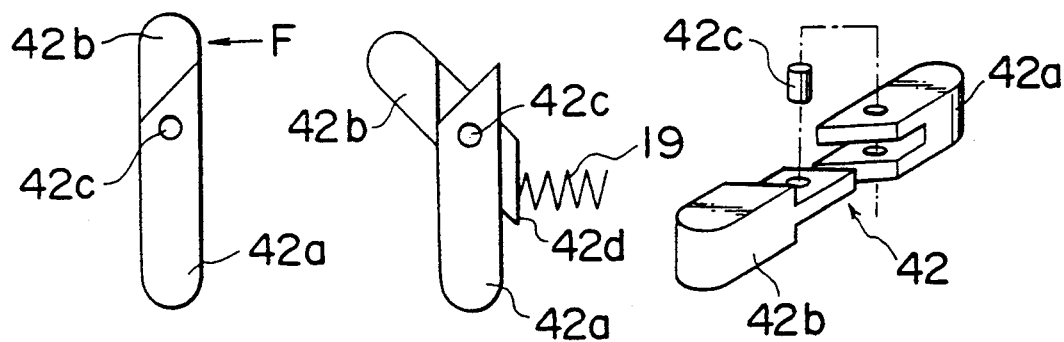
FIG. 7 presents at (A) to (C) schematic diagrams for explaining the individual structures of a bendable stopper.
Figure 8A:
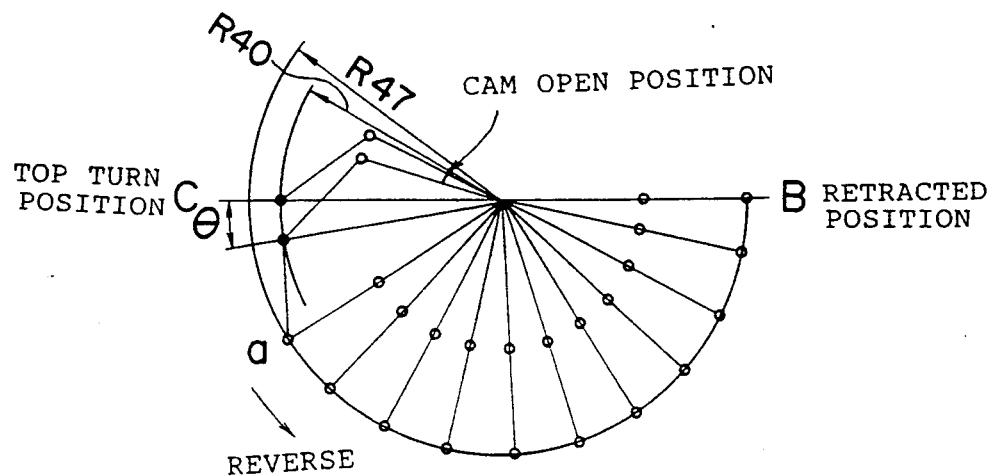
FIG. 8 presents at (A) and (B) schematic diagrams for explaining the loci of a wiper arm when the wiper blade is to be retracted.
Figure 8B:
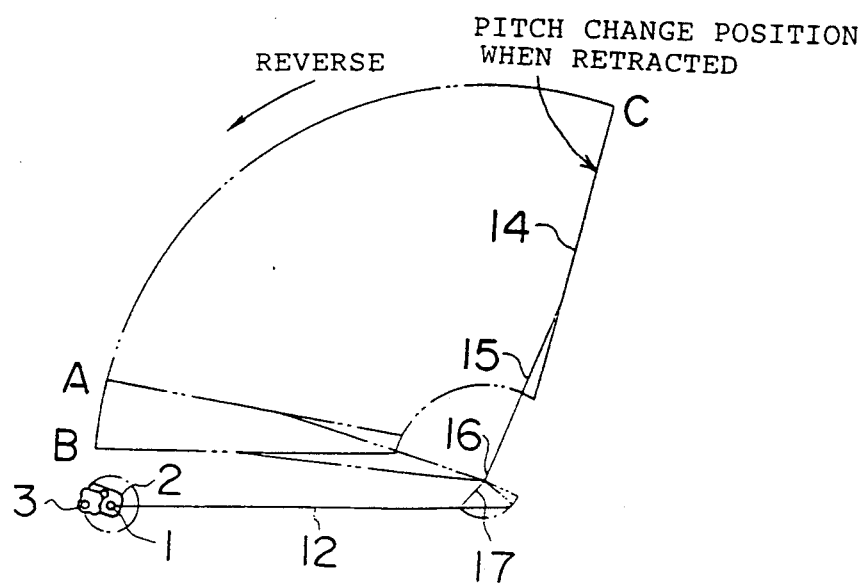
Figure 9:
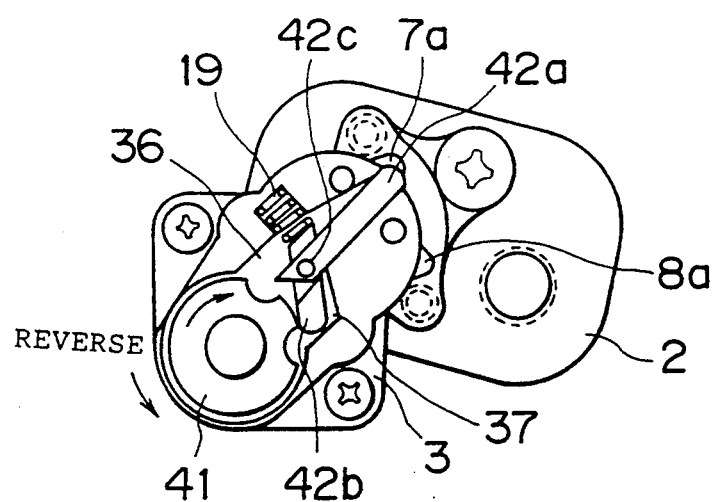
FIG. 9 is a schematic diagram for explaining the bending operations of a stopper.
Figure 11A:
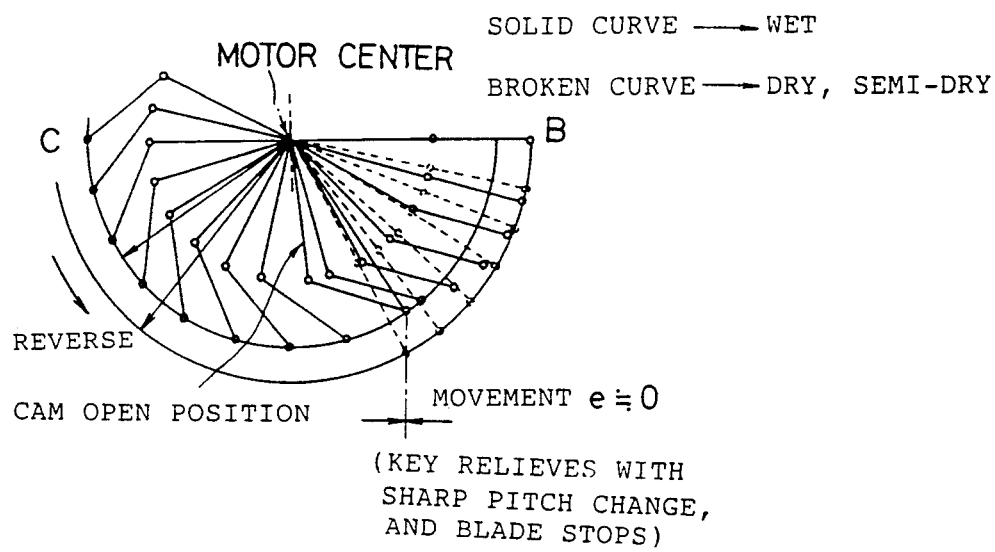
FIG. 11 presents at (A) and (B) schematic diagrams for explaining the crank loci, when in the retracting operations, of the retractable wiper device of the prior art.
Figure 11B:
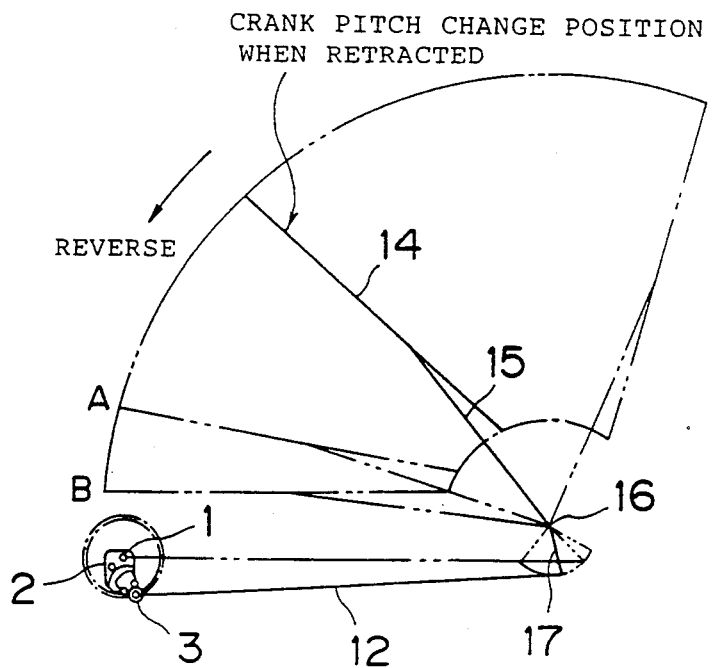
Figure 12:
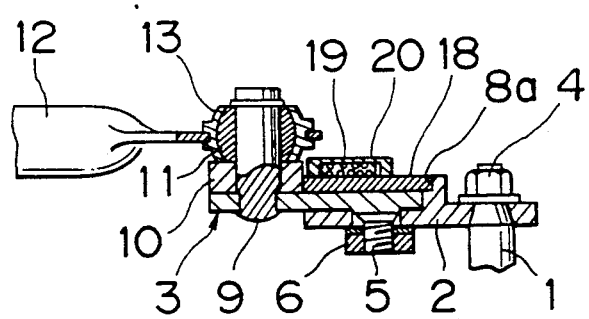
FIG. 12 is a schematic section showing an essential portion of the retractable wiper device of the prior art.
Figure 13:
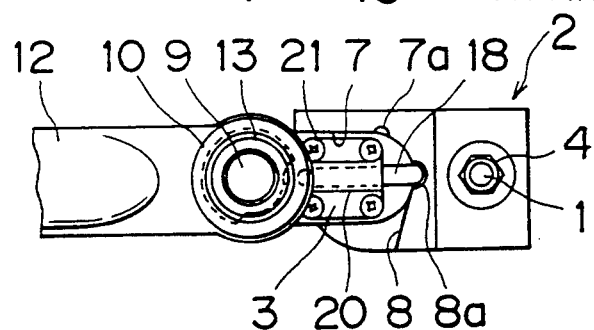
FIG. 13 is a top plan view of the same.
Figure 14:
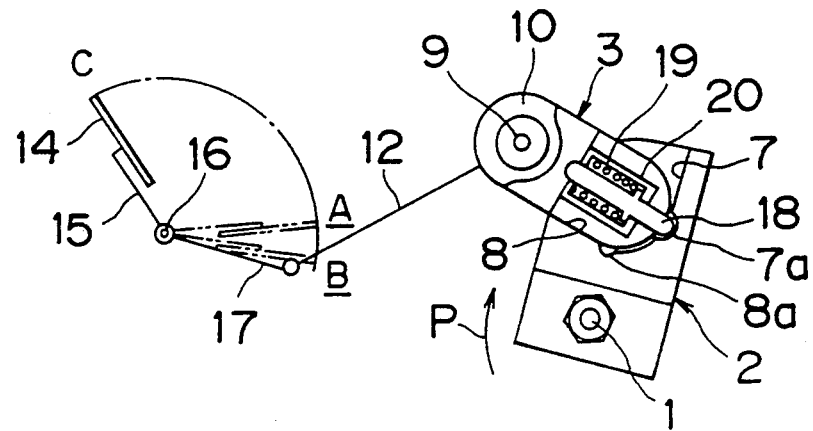
FIG. 14 is an explanatory diagram showing the operating state of the same.
Figure 15A:
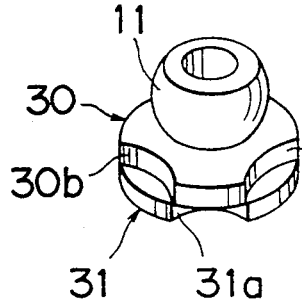
FIG. 15 presents at (A) to (C) schematic diagrams for explaining the structure of the two cams of the prior art.
Figure 15B:
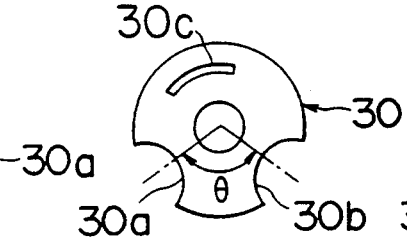
Figure 15C:
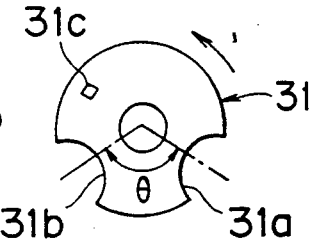
Figure 16A:
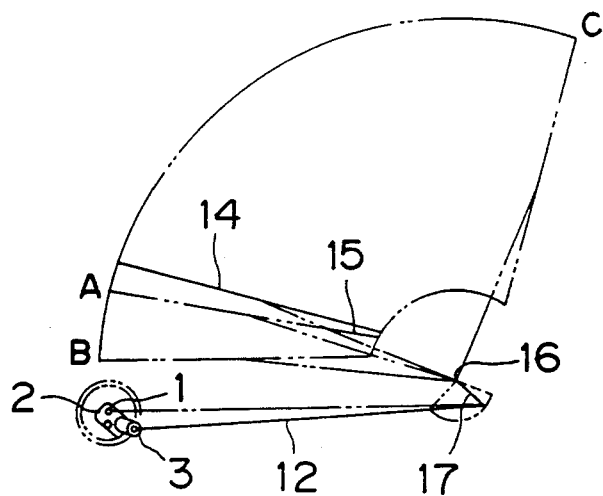
FIG. 16 is a schematic diagram for explaining the structure in which the stopper is relieved in the retractable wiper device of the prior art.
Figure 16B:
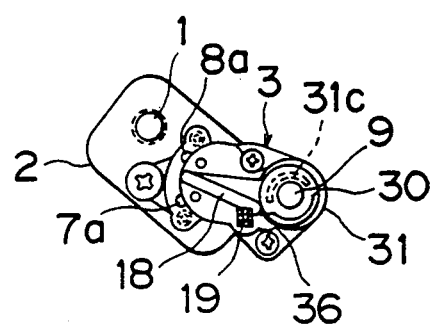

In the present embodiment, the aforementioned stopper 42 is composed of a first stopper 42a and a second stopper 42b, as shown in FIG. 7. These two stoppers 42a and 42b are connected by a pin 42c which is inserted in their intermediate positions go as to rotate only in one direction. In case, an external force F from the second cam member 41 is exerted upon the second stopper 42b, as shown in (A) in FIG. 7, the second stopper 42b rotates on the pin 42c with respect to the first stopper 42a, as shown in (B) in FIG. 7. The rotating direction of this second stopper 42b is identical to the reverse direction of the first crank 2, as shown in FIG. 9. In order to ensure this rotation, the guide frame 20 is formed with a second relief space 37. Since, the spring 19 for holding the stopper 42 in position is mounted between one end face 42d of the second stopper 42b and the guide frame 20, the first and second stoppers restore their original positions when the external force F from the second cam member 41 is not applied.

Next, the operation of the retractable wiper device thus constructed will be described in the following.

Like the structures disclosed in Japanese Patent Applications Laid-Open Nos. 61-244639 and 62-299452, the aforementioned stopper 42 of the present wiper device can also be suppressed in its abutment state at all times, no matter what angular position the cam might take, by associating the aforementioned two cam members 40 and 41 over the wiping actions of the second crank 3 in the forward rotation. Specifically, the bulge 41c of the second cam member 41 fitted in the concentric, arcuate groove 40c of the first cam member 40 moves relatively from the leading to the trailing ends of the arcuate groove 40c. Here, a phase discrepancy is established between the recesses 40a and 40b of the first cam member 40 and the recesses 41a and 41b of the second cam member 41 so that the outer circumferential envelope of the two provides a completely round cam (as shown at (A) in FIG. 1, for example). Thus, the locking action or the suppressing action of the stopper 42 is maintained.

Since the first and second cam members 40 and 41 rotate together as they are, the forward rotations of the output shaft 1 are continued while keeping suppression upon the aforementioned stopper 42 such that the wiper blade 14 repeats its rocking motions between the top and bottom turn positions C and A of its wiping operations.

Next, the operation of the device of the present embodiment for retracting the wiper blade 14 into the retracted position B will be described.

When the wiper blade 14 is in the retracted position B, the wiper switch is turned OFF. Here, the wiper motor has built therein an automatic fixed-position stopping mechanism (not shown) and a circuit (not shown) for a motor reversing mechanism. By the action of this circuit, the motor is continuously driven in the forward direction. However, the reverse rotation of the motor is not started before the wiper blade 14 has returned to the top turn position C.

FIG. 1 shows at (A) and (B) the state in which the wiper blade 14 is returned to the top turn position C. From this state, the motor is rotated backward to rotate the output shaft 1 in the backward direction. FIG. 1 shows at (C) and (D) the state immediately after the reverse of the motor. In this state, the first cam member 40 is opened to have its pitch started to change with respect to the second cam member 41 until the recesses 40a and 41a of the two cam members 40 and 41 partially overlap in their positions facing the stopper 42. Since, however, the leading end of the stopper does not completely come out of the recess 7a, the bent states of the first and second cranks 2 and 3 are held so that the wiper blade 14 moves toward its bottom turn position A.

When the recesses 40a and 41a of the first and second cam members 40 and 41 completely overlap in the position facing the stopper 42, as shown at (E) and (F) in FIG. 1, the leading end of the stopper 42 comes completely out of the recess 7a. In other words, the engagement of the stopper 42 with the cam members 40 and 41 are released in order to release the bent states of the first and second cranks 2 and 3.

As a result, a force, as indicated at an arrow K, is exerted upon the link 12 by the friction between the wiper blade and the glass surface, and the first crank 2 is reversed by the backward rotation of the motor. Then, the shift of the first and second cranks 2 and 3 to their extended states is executed without fail by the following actions. Specifically, if the first crank 2 is driven backward, the leading end of the stopper 42 comes out of the recess 7a into the recess 8a, as shown at (G) and (H) in FIG. 1. On the other hand, the other end of the stopper 42 moves to the first relief space 36 while avoiding any collision or hooking onto with the first and second cam members 40 and 41, as shown at (G) and (H) in FIG. 1. Thus, the suppressed state of the stopper 42 by the first and second cam members 40 and 41 is released in the vicinity of the top reverse position C of the wiper blade 14. At the same time, the first and second cranks 2 and 3 are promptly shifted from their bent states to their extended states immediately after the start of the reverse movement, and cause the stopper 42, to move into the first relief space 36. In the state near the top reverse position C of the wiper blade 14, the crank pitch is greatly changed by the inertia immediately after the turn of the wiper blade 14 even if the wind screen is wet. In the dry or semi-dry state, too, the large pitch change is retained by the frictional resistance. As a result, the shifts of the first and second cranks 2 and 3 to the extended states in the vicinity of the top turn position C is executed without fail irrespective of the state of the wind screen.

During the shifts of the first and second cranks 2 and 3 from their bent states to their extended states, the rotating force of the first crank 2 is not transmitted to the wiper blade 14 so that the wiper blade 14 has its motions stopped in the vicinity of the top turn position C. Since, however, the motion stop position of the wiper blade 14 is near the top reverse position C, the stop state is felt as an extension of the turn so that the motion does not present an abnormality but can improve the operational feel dramatically.

When the leading end of the stopper 42 reaches the recess 8a, as shown at (I) and (J) in FIG. 1, the round peripheral surface of the first cam member 40 presses one end of the stopper 42 so that the leading end of the stopper 42 is inserted into the aforementioned recess 8a. At the same time, the stopper 42 is returned from the relief space 36 to its original position by the urging force of the spring 19 so that its suppressed state is kept. After this, the first crank 2 continues the backward drive so that the first and second cranks 2 and 3 are integrally reversed in their extended states to drive the wiper blade 14 to its retracted position B.

FIG. 1 shows at (K) and (L) the state in which the wiper blade 14 reaches its retracted position B. Then, the automatic fixed-position stop mechanism operates to stop the backward drive of the motor. At this time, moreover, the first and second cam members 40 and 41 have their recesses 40b and 41b coinciding in their phases, and the suppressing action upon the stopper 42 is released at the time when the wiper blade 14 reaches its retracted position B.

According to the retractable wiper device embodiment, the operation of relieving the stopper 42 into the first relief space 36 against the urging force of the spring can be carried out not only upon the retraction of the wiper blade 14 (i.e., the backward rotation of the first crank 2) but also upon the wiping action by the wiper blade 14 (i.e., the forward rotation of the first crank 2). The following effects can be achieved by relieving the stopper 42 at the time of the forward rotation of the first crank 2. In the course from the retracted position B to the normal rotation, for example, an external force such as an intense wind may be exerted upon the wiper blade 14, while the vehicle is running at a high speed, forcing the wiper blade 14 upward or in its rotating direction. In this case, the first cam member 40 associated with the link 12 and the rocking lever 17 is rotationally accelerated in the forward direction in addition to its ordinary rotation. If the stopper 42 is then inclined with respect to the first relief space 36, the first cam member 40 and the stopper 42 can be prevented from any collision or hooking onto to reduce the breakage of their parts. In the device of the present embodiment, too, there can be attained effects similar to those of the structure disclosed in Japanese Patent Application Laid-Open No. 62-299452.

Next, the operation of a structure, in which the aforementioned stopper 42 is made bendable, will be described.

The recesses 40a and 41a of the first and second cam members 40 and 41 of the present embodiment have far narrower angular apertures than those of the recesses 30a and 31a of the cam members 30 and 31 in the prior art, as shown in FIG. 17. With the wiper blade 14 being retracted, i.e., in the state immediately after the wiper blade 14 has been turned at the top turn position C, no surplus is left in the angular apertures of the recesses 30a and 31a of the first and second cam members 30 and 31, as shown in FIG. 18. If, at this time, the load for extending the second crank 3 disappears or if a load (e.g., an external force) for bending the same is applied, the stopper and the cam in the prior art may possibly be locked or broken. In this case, therefore, the second stopper 42b is bent in the backward drive direction of the first crank 2 with respect to the first stopper 42a, as shown in FIG. 9, and is moved into the second relief space 37. Thus, the aforementioned locking phenomena or the breakage of the parts can be avoided.

Incidentally, after the locking phenomena has been avoided, the second stopper 42b is returned to its original state by the urging force of the spring 19.

Although the present invention has been described in connection with its one embodiment, it should not be limited to the embodiment but can be modified in various manners within the scope of its gist.

For example, the positions for forming the individual recesses of the first and second cam members 40 and 41 can be changed into various modifications in addition to those of the embodiment. In short, the cam shapes may be such that both the first and second cam members 40 and 41 are positioned in the suppression releasing positions of the stopper 42 when the wiper blade 14 is in the vicinity of the top turn position C while the first crank 2 is rotating backward.

As has been described hereinbefore, according to the present invention, the cam for suppressing and releasing the stopper for holding the first and second cranks in the predetermined angular states is constructed of two cam members. Thus, in the forward rotation of the first crank, these two cam members are associated to keep the stopper in the suppressed state at all times. In the backward rotation of the first crank, on the other hand, when the wiper blade is to be retracted into the retracted position, the settings of the first and second cranks generally in the extended positions can be completed in the vicinity of the top turn position of the wiper blade irrespective of the state of the wind screen. In an intermediate position between the top and bottom turn positions, when the wiper blade is to be retracted, the wiper blade can be prevented from moving to have its wiping speed fluctuating. Thus, it is possible to improve the operation feel drastically and to prevent water droplets from being left in streaks on the glass surface due to a change in the wiping speed.

What is claimed is:

1. A retractable wiper device comprising:
   a first crank connected to a reduction output shaft of a motor for being rotated in a forward direction and a backward direction;
   a second crank having a cover and being rotatably supported to said first crank for being rotated into a first state so as to be bent at a predetermined angle with respect to said first crank while said first crank is being rotated in the forward direction, and for being rotated into a second state so as to be substantially linear with respect to said first crank while said first crank is being rotated in the backward direction;
   a stopper member supported movably by said second crank for being pushed into engagement with said first crank when said second crank is brought into said first or second state to keep said second crank in said first or second state;
   a cam including: a first cam member rotatably supported to said second crank and secured to a link for transmitting rotation of said second crank to a wiper blade that is operatively connected to said link, said first cam member having a first face for pushing said stopper member into engagement with said first crank and a second face for releasing the engagement of said stopper member with said first crank; and a second cam member provided at said second crank so as to be coaxial with said first cam member, said second cam member being in contact with said first cam member and permitting a predetermined angle of play between the first and second cam members, said second cam member having a third face for pushing said stopper member into engagement with said first crank and a fourth face for releasing the engagement of said stopper member with said first crank, said cam being shaped such that said first face and said third face keep said stopper member in engagement with said first crank in a pushed state at all times when said first crank is rotated in the forward direction to reach a forward rotated state and such that said second face and said fourth face overlap one another when the wiper blade nears a top turn position, at which point the rotation of said first crank is reversed such that said first crank proceeds toward a backward rotated state at which the engagement of said stopper and said first cam is released; and
   a first relief portion provided between said second crank and said cover for receiving an end portion of said stopper member at the side of said cam in the direction of forward rotation of said first crank when said first crank is in its backward rotated state, the cam being shaped such that the first and the second cam members are oriented at the position in which the stopper member is released when the wiper blade is in the vicinity of the top turn position while said first crank is rotating in the backward direction, and the stopper member slides into the relief portion and is released from engagement with said first crank when said first crank and said second crank are substantially linearly positioned with respect to one another.

2. A retractable wiper device according to claim 1, wherein said stopper member is constructed such that said stopper member bends at a substantially intermediate portion thereof in the direction of backward rotation of said first crank.

3. A retractable wiper device according to claim 2, further comprising urging means for urging the end portion of said stopper member in the direction of backward rotation of said first crank at all times.

4. A retractable wiper device according to claim 3, wherein said predetermined angle of play between said first and second cam members is defined by a groove which is formed in one of said first cam member and said second cam member and which is spaced apart from and curved about a central axis thereof, and a projection which is formed in the other of said first and second cam members and positioned in said groove.

5. A retractable wiper device according to claim 4, wherein said second face of said first cam member and said fourth face of said second cam member are formed with recesses for receiving the end portion of said stopper member.

6. A retractable wiper device according to claim 4, further comprising a second relief portion for receiving the end portion of said stopper member when said stopper member is bent.

7. A retractable wiper device according to claim 3, wherein said urging means includes a spring arranged to return said stopper member from a bent state to a non-bent state.

8. A retractable wiper device according to claim 1, wherein the engagement of said stopper member with said first crank includes an end of said stopper member being positioned in a recess formed in said first crank.

9. A retractable wiper device comprising:
   a first crank connected to a reduction output shaft of a motor for being rotated in a forward direction and a backward direction;
   a second crank having a cover and movably disposed on said first crank for being rotated into a first state so as to be bent at a predetermined angle with respect to said first crank while said first crank is being rotated in the forward direction, and for being rotated into a second state so as to be substantially linear with respect to said first crank while said first crank is being rotated in the backward direction;
   first and second recesses formed in said first crank such that they correspond to said first and second states of said second crank;
   a stopper member movably supported on said second crank for being pushed into said first recess of said first crank when said second crank is brought into said first state to keep said second crank in said first state, and for being pushed into said second recess of said first crank when said second crank is brought into said second state to keep said second crank in said second state;

cam means including: a first cam member rotatably supported to said second crank and connected to a link for transmitting rotation of said second crank to a wiper blade that is operatively connected to the link, said first cam member having a first face for pushing said stopper member towards said first or second recess of said first crank and a second face for allowing said stopper member to move out of said first recess or said second recess of said first crank; and a second cam member rotatably supported to said second crank coaxially with said first cam member, said second cam member being in contact with said first cam member and permitting a predetermined angle of play between the first and second cam members, said second cam member having a third face for pushing said stopper member towards said first or second recess of said first crank and a fourth face for allowing said stopper member to move out of said first recess or said second recess of said first crank, said first face, said second face, said third face and said fourth face being positioned such that said first face of said first cam member and said third face of said second cam member keep said stopper member in a state in which the stopper member is pushed into one of the first and second recesses of the first crank at all times when said first crank is being rotated in the forward direction to reach a forward rotated stated, and such that said second face and said fourth face overlap one another when said wiper blade nears a top turn position, at which point the rotation of said first crank is reversed such that the first crank proceeds toward a backward rotated state in which the engagement of said stopper member and said one of first and second recesses of said first crank is released; and a first relief portion provided between said second crank and said cover for receiving the end portion of said stopper member positioned adjacent said first cam member and said second cam member in the direction of forward rotation of said first crank when said first crank is in the backward rotated state, the cam means being shaped such that the first and second cam members are oriented at the position in which the stopper member is released when the wiper blade is in the vicinity of the top turn position while said first crank is rotating in the backward direction, and said stopper member slides into the relief portion and is released from engagement with said recess of said first crank when said first crank and said second crank are substantially linearly positioned with respect to one another.

10. A retractable wiper device according to claim 9, wherein said stopper member includes first and second elongated stopper elements that are pivotally connected to each other, said first stopper element facing said first crank and said second stopper element facing said cam means, said second stopper element being connected to said first stopper element to permit said second stopper element to be bent in the direction of backward rotation of said first crank with respect to said first stopper element.

11. A retractable wiper device according to claim 10, further comprising urging means for urging said stopper member in the direction of backward rotation of said first crank at all times.

12. A retractable wiper device according to claim 11, wherein said predetermined angle of play between said first and second cam members is defined by a groove which is formed in one of said first cam member and said second cam member and which is spaced apart from and curved about a central axis, and a projection which is formed in the other one of said first and second cam members and inserted into said groove.

13. A retractable wiper device according to claim 12, wherein said second face of said first cam member and said fourth face of said second cam member are formed with recesses for receiving an end portion of said second stopper element of said stopper member.

14. A retractable wiper device according to claim 10, further comprising a second relief portion for receiving said second stopper element of said stopper member.

15. A retractable wiper device according to claim 14, wherein said urging means includes a spring arranged to return said second stopper element of said stopper member to a non-bent state.

16. A retractable wiper device comprising:
a first crank having recesses and being connected to a reduction output shaft of a motor;
a second crank rotatably supported on said first crank so as to maintain a predetermined bent angle between said first and second cranks when said first crank is in a state of forward rotation, and so as to be in a linear state with respect to said first crank when the first crank is in a state of backward rotation;
a stopper slidably supported by said second crank such that said stopper is inserted into one of said recesses of said first crank when the first and second cranks reach a bent angular position relative to one another or a linear angular position relative to one another to maintain said first and second cranks in one of said bent and linear angular positions;
a link rotatably connected to said second crank to transmit rotational movements of said second crank to a wiper blade;
a first cam member rotatably mounted on said second crank and coaxially disposed on a rotatably connected portion of said link on said second crank so as to press said stopper into said recess of said first crank or release said stopper from said recess of said first crank in accordance with a rotational position of said second crank;
a second cam member rotatably mounted on said second crank and coaxially disposed to said first cam member so as to be rotatable relative to said first cam member at a predetermined angle for pressing said stopper into said recesses of said first crank and releasing said stopper from said recesses of said first crank in a different phase of said first cam member, said second cam member pressing said stopper in association with said first cam member when said first crank is in a state of forward rotation; and
a relief portion provided on said second crank to receive an end portion of said stopper that is positioned at a side abutting said first and second cam members in the direction of forward rotation of said first crank, the shape of said first and second cam members being such that both said first and second cam members are situated at the position at which the stopper member is released when the wiper blade is in the vicinity of the top turn position while said first crank is in a state of backward rotation; and said first and second cranks being situated substantially linearly with respect to one another when the wiper blade is in the vicinity of the top turn position and said first crank is in a state of backward rotation, and said stopper slides into the relief portion and is released from its engagement with one of said recesses of said first crank when said first crank and said second crank are substantially linearly disposed with respect to one another.

17. A retractable wiper device according to claim 16, wherein said stopper has an end which abuts said first and second cam members and which is bendable with respect to another portion of said stopper in the direction of backward rotation of said first crank.

* * * * *